(12) United States Patent
Coulon et al.

(10) Patent No.: US 12,475,214 B2
(45) Date of Patent: Nov. 18, 2025

(54) CODE FLOW PROTECTION WITH ERROR PROPAGATION

(71) Applicant: THALES DIS FRANCE SAS, Meudon (FR)

(72) Inventors: Jean-Roch Coulon, Le Tholonet (FR); André Sintzoff, Marseilles (FR); Zbigniew Chamski, Plock (PL)

(73) Assignee: THALES DIS FRANCE SAS, Meudon (FR)

( * ) Notice: Subject to any disclaimer, the term of this patent is extended or adjusted under 35 U.S.C. 154(b) by 271 days.

(21) Appl. No.: 18/037,393

(22) PCT Filed: Nov. 8, 2021

(86) PCT No.: PCT/EP2021/080883
§ 371 (c)(1),
(2) Date: May 17, 2023

(87) PCT Pub. No.: WO2022/106229
PCT Pub. Date: May 27, 2022

(65) Prior Publication Data
US 2024/0012886 A1 Jan. 11, 2024

(30) Foreign Application Priority Data
Nov. 18, 2020 (EP) .................................. 20306401

(51) Int. Cl.
*G06F 21/54* (2013.01)
*G06F 21/14* (2013.01)
(Continued)

(52) U.S. Cl.
CPC .............. *G06F 21/54* (2013.01); *G06F 21/14* (2013.01); *G06F 21/55* (2013.01); *G06F 21/64* (2013.01)

(58) Field of Classification Search
CPC .......... G06F 21/54; G06F 21/55; G06F 21/14; G06F 21/64
See application file for complete search history.

(56) References Cited

U.S. PATENT DOCUMENTS 5,388,253 A * 2/1995 Geneste .............. G06F 11/1076
714/38.1
5,974,529 A * 10/1999 Zumkehr .............. G06F 9/3005
714/E11.178

(Continued)

FOREIGN PATENT DOCUMENTS

WO 2012010205 A1 1/2012

OTHER PUBLICATIONS

Arnautov, Sergei; Fetzer, Christof; "ControlFreak: Signature Chaining to Counter Control Flow Attacks," 34th Symposium on Reliable Distributed Systems (SRDS), IEEE, Sep. 2015, pp. 84-93.*

(Continued)

*Primary Examiner* — Victor Lesniewski

(57) ABSTRACT

Provided is an execution system including a central processing unit (CPU), a system memory (SM) storing a genuine program (cGC) having ciphered instructions (CI) stored at determined addresses. A secure agent component (SAC) is dedicated to the protection of the execution of the cGC. The SAC comprises a signature register (SR) storing an instruction flow signature depending on previously executed instructions and a ciphering/deciphering module. A new instruction flow signature is determined depending on instruction and on an instruction flow signature of the previous instruction in the instruction flow of the cGC before storing this new instruction flow signature in the signature register (SR). Other embodiments disclosed.

12 Claims, 4 Drawing Sheets

(51) Int. Cl.
  *G06F 21/55* (2013.01)
  *G06F 21/64* (2013.01)

(56) References Cited

U.S. PATENT DOCUMENTS

| | | | |
|---|---|---|---|
| 8,782,435 B1* | 7/2014 | Ghose | G06F 12/0862 |
| | | | 712/216 |
| 2007/0174750 A1* | 7/2007 | Borin | G06F 11/1004 |
| | | | 714/732 |
| 2009/0125728 A1 | 5/2009 | Kim et al. | |
| 2010/0153745 A1 | 6/2010 | Onno et al. | |
| 2012/0233446 A1* | 9/2012 | Gammel | G06F 9/4812 |
| | | | 712/E9.06 |
| 2013/0019231 A1* | 1/2013 | Mangard | G06F 8/43 |
| | | | 717/151 |
| 2015/0332027 A1 | 11/2015 | Hoogerbruggge | |
| 2017/0242778 A1* | 8/2017 | Terras | G06F 21/44 |
| 2018/0089422 A1* | 3/2018 | Kounavis | G06F 21/54 |
| 2018/0260564 A1* | 9/2018 | Porteboeuf | G06F 11/28 |
| 2018/0285189 A1 | 10/2018 | Sere et al. | |
| 2020/0257805 A1* | 8/2020 | Courousse | G06F 9/3005 |
| 2021/0026950 A1* | 1/2021 | Ionescu | G06F 9/545 |
| 2021/0133314 A1* | 5/2021 | Wang | G06F 9/3806 |
| 2022/0019657 A1* | 1/2022 | Sethumadhavan | G06F 21/53 |
| 2023/0049233 A1* | 2/2023 | Davidovich | G06F 9/44521 |

OTHER PUBLICATIONS

International Search Report and Written Opinion mailed on Feb. 10, 2022 for corresponding International Application PCT/US2021/080883 (14 pages).

* cited by examiner

CODE FLOW PROTECTION WITH ERROR PROPAGATION

FIELD OF THE INVENTION

The present invention relates to an execution system having at least a central processing unit, a system memory storing a genuine program having ciphered instructions stored at determined addresses and a secure agent component dedicated to the protection of the execution of the genuine program, said secure agent component being inserted between the system memory and the central processing unit and fetching the ciphered instructions occurring between memories and the central processing unit.

The invention also pertains to a method to protect the execution of a genuine program having ciphered instructions stored in a system memory at determined addresses, said genuine program being to be executed by a central processing unit using said system memory, said method being implemented thanks to a secure agent component dedicated to the protection of the execution of the genuine program, said secure agent component being inserted between the system memory and the central processing unit and fetching the ciphered instructions occurring between memories and the central processing unit.

BACKGROUND OF THE INVENTION

Generally, native code execution can be easily attacked by fault injection, e.g., laser attacks, electromagnetic attacks, photoemission . . . . Such attacks can lead to an instruction corruption or an address corruption of the next instruction to be executed. Instruction corruption makes it possible to execute an instruction different from the one originally present in the program and/or to use modified operands. Address corruption lets an attacker illegally access sensitive information or jump to unverified code. This is a way for an attacker to start a combined attack.

A lot of countermeasures inserted in the native code itself exist. The state-of-the-art of the anti-rerouting solutions implemented so far presents several drawbacks. Many current solutions insert metadata directly into the program. Such metadata are inserted by CPU tools such as compilers or post-processors. As compiler domain requires significant technical expertise, the solution development is costly.

Another consequence is the non-compatibility of the resulting code with the original CPU Instruction Set Architecture (ISA). Tools like compilers (GCC, Clang/LLVM, KEIL . . . ) or debuggers (GDB . . . ) become no longer compatible with the resulting program code and must be modified.

The code size impact is one of the main drawbacks of the current solutions. It is common to see a 20% increase in code size. Also metadata granularity is fixed, so the security and code size impact cannot be fine-tuned.

Accordingly, further alternatives and advantageous solutions would be desirable in the art.

SUMMARY OF THE INVENTION

The present invention aims at avoiding, or at least making more difficult the above-mentioned malicious attacks. The invention's purpose is to detect illegal modifications of instructions.

The present invention is defined, in its broadest sense, as claimed in claim 1, as an execution system of the field of the invention, wherein said secure agent component comprises at least a signature register storing an instruction flow signature depending on previously executed instructions and a ciphering/deciphering module, said secure agent component being further such that, the deciphering module deciphers each fetched ciphered instruction by executing a function depending on the ciphered instruction and on the instruction flow signature as stored in the signature register before sending the de-ciphered instruction to the central processing unit, said secure agent component being further such that it then determines a new instruction flow signature depending on the instruction and on the instruction flow signature of the previous instruction in the instruction flow of the genuine program before storing this new instruction flow signature in the signature register, said new instruction flow signature being used for the deciphering of the next instruction of the genuine program to be executed.

With the invention, the instruction flow protection, being a kind of anti-rerouting protection, is implemented without impacting ISA. Performance is not impacted. Also RTL code impact on the central processing unit is limited. Indeed, overall impact on system design is limited.

Furthermore code size impact is twice smaller than in prior art solutions. In addition to the anti-rerouting countermeasure, the invention implements instruction ciphering. The ciphering can easily be diversified ensuring the code to be different on each of execution system.

Also the genuine program is not impacted by anti-rerouting functionality and remains compatible with standard ISA and tools. The solution can be applied on all types of CPU Instruction Set Architecture (ISA) because deciphered instructions correspond to the standard ISA. Also, the code penalty can be fine-tuned in relation to security and code size target. A good trade-off leads to a memory overhead of less than 10% of the original code size.

The creation of the instruction flow signature memory is done in post processing, thus after compilation and link of the genuine program.

With the invention, standard instructions with a post processing can be easily and efficiently protected.

It is here noted that the instruction flow signature is claimed to be calculated from the instruction while not stating if the instruction is ciphered or deciphered. The use of the deciphered instruction is described in the following. The cryptographic algorithm is conceived accordingly for the deciphered instruction to be used in the instruction flow signature calculation.

According to an advantageous feature, said secure agent component being such that it then determines the new instruction flow signature depending on the ciphered instruction and on the instruction flow signature of the previous instruction in the instruction flow of the genuine program.

The use of the ciphered instruction in the instruction flow signature calculation presents the advantage to enable further diversification of the ciphering and of the signature calculation for each execution system. For the invention itself, the use of the ciphered or of the deciphered instruction in the instruction flow signature calculation is a matter of choice that does not impact on the protection offered by the invention.

According to a feature of the invention, the genuine program comprising successive instructions, the secure agent component determines the new instruction flow signature by calculation of a signature function depending on the instruction and on the instruction flow signature as used for deciphering and as previously stored in the signature register.

This feature enables successive instruction chaining, devoid from control flow instruction, to be protected using a chain of instruction flow signatures calculated one after the other and stored in the signature register for the next instruction.

According to another feature of the invention, the signature function is using initial values specific to the execution system.

This feature enables to further diversify the protection of the invention as the signature values are different for each execution system having the same genuine program.

According to an advantageous feature, the signature function is specific to the execution system.

This feature enables to further diversify the protection of the invention by using a different signature function for each execution system.

According to another feature of the invention, the genuine program comprising branch control flow instructions, the secure agent component further comprises an instruction flow signature memory created at the compilation time of the genuine program from the genuine program, said instruction flow signature memory reproducing at least a subset of the determined addresses of the genuine program and comprising pre-calculated instruction flow signatures at the corresponding determined addresses of control flow instructions of the genuine program, said secure agent component being further such that, when a branch control flow instruction is deciphered, the signature register is overwritten with the instruction flow signature stored in the instruction flow signature memory at the corresponding address of the branch control flow instruction.

This feature enables to process branch control flow instructions while keeping the protection of the invention. A dedicated memory stores the instruction flow signature needed for a continuity to be insured in the chain of instruction flow signatures.

In a preferred embodiment avoiding to have to store the address of the instruction, the instruction flow signature memory reproduces the determined addresses with the corresponding instruction flow signatures. However, in the case of a subset of instructions to be protected, only a subset of the determined addresses of those instructions with the addresses of the instruction, to enable to find them during execution of the program, could be stored in the instruction flow signature memory.

According to a next feature of the invention, the genuine program comprising call control flow instructions, the secure agent component further comprises a signature stack, said secure agent component being further such that, when a call control flow instruction is deciphered, it calculates the new instruction flow signature and pushes it onto the signature stack before overwriting the signature register with the instruction flow signature stored in the instruction flow signature memory at the corresponding address of the call control flow instruction.

This feature enables the invention to protect any program having call control flow instructions. The instruction flow signature to be used for returning in the execution of the main body of the genuine program is thus stored while the call instruction is processed before a return control flow instruction occurs.

According to a next feature of the invention, the genuine program comprising return control flow instruction, said secure agent component being further such that, when a return control flow instruction is deciphered, it copies the instruction flow signature as stored in the signature stack in the signature register as new instruction flow signature to be used for the next instruction.

This feature enables to process any return control flow instruction by popping out the value stored in signature stack to be used for the next instruction after the return control flow instruction.

According to an additional feature of the invention, the secure agent component is adapted to access to a check memory listing check tags being pre-calculated signature of the instructions stored at the determined addresses of the genuine program, such signatures of the instructions being to be compared to the instruction flow signature for each fetched instruction by the secure agent component.

According to an advantageous feature, said check memory and said instruction flow signature memory are merged in a single check and instruction flow signature memory where a instruction flow signature and a check tag are stored at a same address corresponding to the one of the data to be protected in the system memory.

This advantageous feature enables to have the implementation of the invention with the option of the check tags while not having an increase of the needed memory resources and thus to reduce silicon footprint for the implementation of the invention with optional check tags.

The invention also relates to a method to protect the execution of a genuine program having ciphered instructions stored in a system memory at determined addresses, said genuine program being to be executed by a central processing unit using said system memory, said method being implemented thanks to a secure agent component dedicated to the protection of the execution of the genuine program inserted between the system memory and the central processing unit and fetching the ciphered instructions occurring between memories and the central processing unit, said secure agent component further comprising at least a signature register storing an instruction flow signature depending on previously executed instructions and a ciphering/deciphering module, said method comprising the steps of, for the secure agent component:

deciphering each fetched ciphered instruction by executing a function depending on the ciphered instruction and on the instruction flow signature as stored in the signature register, sending the de-ciphered instruction to the central processing unit, determining a new instruction flow signature depending on the instruction and on the instruction flow signature of the previous instruction in the instruction flow of the genuine program, storing the new instruction flow signature in the signature register, using said new instruction flow signature as stored in the signature register for the deciphering of the next instruction of the genuine program to be executed.

This method implemented in an execution system enables to protect the genuine program.

According to the previously presented features of the invention, the method is such that, the genuine program comprising branch control flow instructions and the secure agent component further comprising an instruction flow signature memory created at the compilation time of the genuine program from the genuine program, said instruction flow signature memory reproducing the determined addresses of the genuine program and comprising precalculated instruction flow signatures at the corresponding addresses of control flow instructions of the genuine program, said method being further such that it comprises, when a branch control flow instruction is deciphered, the step of overwriting the signature register with the instruction flow signature stored in the instruction flow signature memory at the corresponding address of the branch control flow instruction.

The method is such that, the genuine program comprising call control flow instructions and the secure agent component further comprising a signature stack, the method further comprises the following steps of, when a call control flow instruction is deciphered:

calculating of a new instruction flow signature,
pushing the new instruction flow signature in the signature stack,
overwriting the signature register with the instruction flow signature stored in the instruction flow signature memory at the corresponding address of the call control flow instruction.

The method is such that, the genuine program comprising return control flow instruction, said method comprising, when a return control flow instruction is deciphered, the step of copying the instruction flow signature as stored in the signature stack in the signature register as new instruction flow signature to be used for the next instruction.

According to an advantageous additional feature, the method comprises the steps of, for the secure agent:

accessing to a check memory listing check tags being pre-calculated signature of the instructions stored at the determined addresses of the genuine program,
comparing such signatures of the instructions to the instruction flow signature for each fetched instruction by the secure agent component.

Therefore, the method according to the present invention allows reducing the risks of successful malicious attacks. At least, the attacks will not been carried out without being detected for a malicious attacker.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
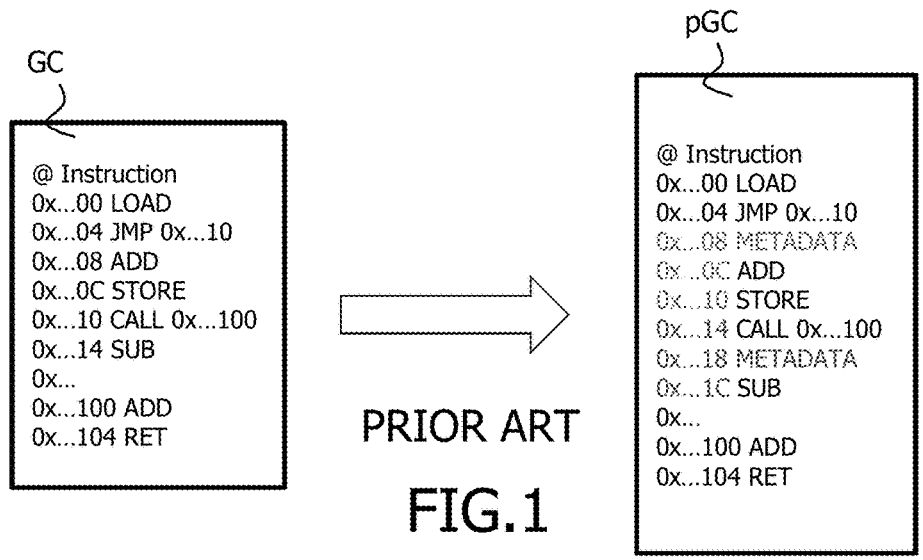
FIG. 1 schematically shows a solution of the prior art to protect code execution.

For a more complete understanding of the invention, the invention will now be described in detail with reference to the accompanying drawings. The detailed description will illustrate and describe what is considered as a preferred embodiment of the invention. It should of course be understood that various modifications and changes in form or detail could readily be made without departing from the scope of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

FIG. 1 schematically shows a solution of the prior art to protect a genuine code execution. On the left is shown an exemplary genuine code GC comprising a given number of determined addresses where successive instructions are stored.

On the right side is shown the same program pGC after implementation of countermeasures of the prior art. Those countermeasures lead to the insertion of metadata in grey at addresses 0x . . . 08 and 0x . . . 18. It implies a mandatory modification of the determined addresses of the genuine program GC. The set of instructions is modified as the metadata are mixed with the instructions. The chain of tools is made more complex by the introduction of metadata that has to be read by the central processing unit while executing the protected code pGC.

The obtained program pGC does not respect the genuine program GC, which can typically be a standard program. The executed program pGC is not anymore the program GC that is executed if the prior art countermeasure is not implemented.

Figure 2:
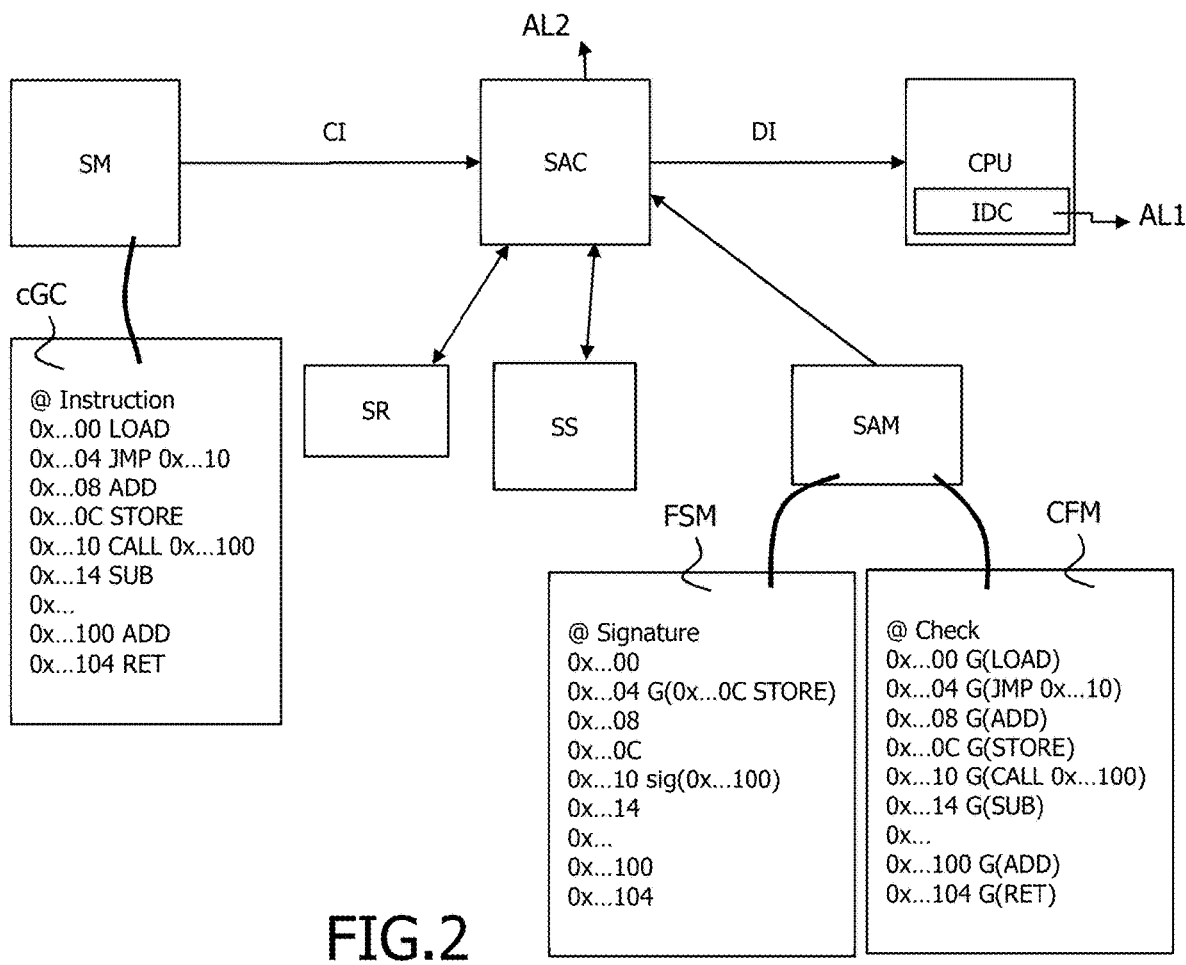
FIG. 2 schematically shows an execution system of the invention.

FIG. 2 schematically shows an execution system of the invention.

This execution system is composed of a central processing unit CPU and of at least one system memory SM to store a genuine program as a list of instructions at determined addresses. The main advantage of the invention is that it only introduces a ciphering of the instructions of the genuine program, leading to a ciphered genuine program cGC which is the one stored in the system memory. The ciphering does not introduce any additional instructions or metadata nor introduce instructions' addresses modification. The determined addresses of the genuine program GC are maintained.

The genuine program GC can thus be any kind of genuine program like an open source program for example, or any certified program, or any program having specific compliance to any standard, norm, etc. and which must remain unchanged while the security of its execution needs to be improved. Such program is compliant with the Instruction Set Architecture (ISA) and is built, i.e. compiled and linked, without taking care of the invention constraints.

System memory SM, as shown on FIG. 2, can be a system memory or a cache where the program is stored with its variables to be executed in the execution environment as shown on FIG. 2. Indeed the addresses of the data in the system memory SM or in a cache are the same. The cache is a memory smaller than the system memory SM. A given location in the cache indeed corresponds to many locations in memory. While a data is stored at a cache memory address, the cache indeed stores an information to strictly identify the corresponding system memory address. It is also noted here that the system memory SM can also be implemented using a plurality of memories spread on diverse platforms, the principles of the invention remaining the same.

On FIG. 2, is shown an exemplary genuine code cGC listing with addresses where instructions of the program to be protected are stored. Instructions are shown non-ciphered on the FIG. 2 for the need of explanation of the invention while they are indeed stored ciphered in the system memory SM.

In system memory SM is thus stored, or copied in the case where this part of memory is in a cache, a program to be executed by the system of the invention.

The central processing unit CPU executes the genuine code by fetching the instructions from system memory SM and reading and writing data from/into system memory SM.

The security protection of the invention is inserted in the above presented execution system by introducing a secure agent component SAC, located between the CPU and the system memory SM, and by placing additional information, consisting in instruction flow signatures, in memories. The secure agent component SAC is indifferently connected to the represented system memory SM or to a cache.

This instruction flow signature information can be added in memory classically accessible by the CPU, e.g. RAM, NVM or in a dedicated memory, called secure agent memory SAM as illustrated on FIG. 2.

For the need of the invention, the secure agent memory SAM comprises an instruction flow signature memory FSM capable of listing all addresses of the genuine program GC. At addresses of control flow instructions (e.g., branch instruction JMP, call instruction CALL, return instruction RET) the secure agent memory SAM contains the associated instruction flow signature FS(SAM) to be used for the next instruction following the concerned control flow instruction.

The instruction flow signature memory FSM is not required to always enumerate all addresses of the genuine program GC. It is sufficient for the instruction flow signature memory FSM to be able to enumerate all addresses containing a signature.

In the example of FIG. 2, the genuine program GC comprises a branch instruction JMP at the address 0X . . . 04, a call instruction CALL at the address 0x . . . 10 and a return instruction RET at address 0x . . . 104 to end the called function by returning to the address immediately following address 0x . . . 10.

For each of the addresses where a control flow instruction other than return instruction is present in the genuine program GC, a pre-stored instruction flow signature is stored at the corresponding address in the instruction flow signature memory FSM.

According to the invention, the secure agent component SAC monitors the accesses occurring between the central processing unit CPU and system memories SM. It accesses the memories in which is stored the additional information of the invention, i.e. the instruction flow signature memory FSM in the secure agent memory SAM on FIG. 2.

The secure agent component SAC also contains or has access to an internal signature register SR holding instruction flow signature FS(SR) needed for the implementation of the invention. Indeed, the secure agent component SAC can access the dedicated secure agent memory SAM or any memory accessible by the CPU that would contain the additional data needed for the implementation of the invention. For this purpose, the secure agent component SAC may modify the bus data access or issue additional data bus accesses.

No representations are made about the organisation of the secure agent memory SAMs. It is sufficient that a set of secure agent memories SAM accessible by the secure agent component SAC be able to store the instruction flow signatures of all control flow instructions present in the genuine program GP.

There can thus be as many secure agent memories SAM in the secure agent component SAC or accessible by the secure agent component as there are system memories SM accessible by the CPU. Depending on the implementation there can be a single memory gathering all memories to include the instruction flow signatures, for example in the secure agent component SAC, or as many memories as instruction flow signatures to be stored. Also, in an implementation, the instruction flow signatures FS(SAM) that have to be stored can be stored in the system memory SM itself with the data and the set of ciphered instructions. In such an implementation, the system memory SM will store words of, for example, 32+n bits, 32 bits being the ones read by the CPU to execute the program, and n being the number of bits by which the instruction flow signature FS(SAC) is identified, those n bits being thus read by the secure agent component SAC. This does not thus modify the program itself as the CPU will only read the first 32 bits (or the 64 bits if the CPU works on such other size of data).

It is here also noted that hybrid implementations where the memories used for the implementation, and thus for the storage of instruction flow signatures, are present at various locations in the system can also be implemented according to the invention.

The solution can be applied on all types of CPU Instruction Set Architecture because the instruction encoding and the determined addresses of the genuine program are not modified. Moreover the register transfer level RTL code impact on the CPU and on the secure agent component SAC is limited.

In the exemplary sample code shown on FIG. 2, the program comprises at least one branch control flow instruction JMP, one call control flow instruction CALL and one return control flow instruction RET for which the behaviour of the invention is specific as claimed and as it will be described in the following.

The invention is minimally implemented with a signature register SR monitored by the secure agent component SAC. This signature register SR is intended to store successive instruction flow signatures to be used to decipher successive instructions of the program as it will be explained below. It is intended to receive any next new instruction flow signature that is to be used for the next instruction to be deciphered once the previous instruction has been deciphered. The invention is thus based on a chained ciphering/deciphering. According to the invention, the genuine code is pre-processed outside the device to pre-cipher the instructions before being stored in the system memory SM. The instruction flow signature memory is also created and stored at the time of this pre-processing.

When needed, the chained ciphering is initialized with an initial instruction flow signature for the first instruction of a program or in case the program comprises functions. Such an initial instruction flow signature can for example be a simple signature of the address of the first instruction. This initial value must be provided by the tool chain in order for the processing of subsequent instructions to be processed in a coherent way. Such initial instruction flow signatures are stored at corresponding addresses in the instruction flow signatures FSM at the time of pre-processing.

Figure 3:
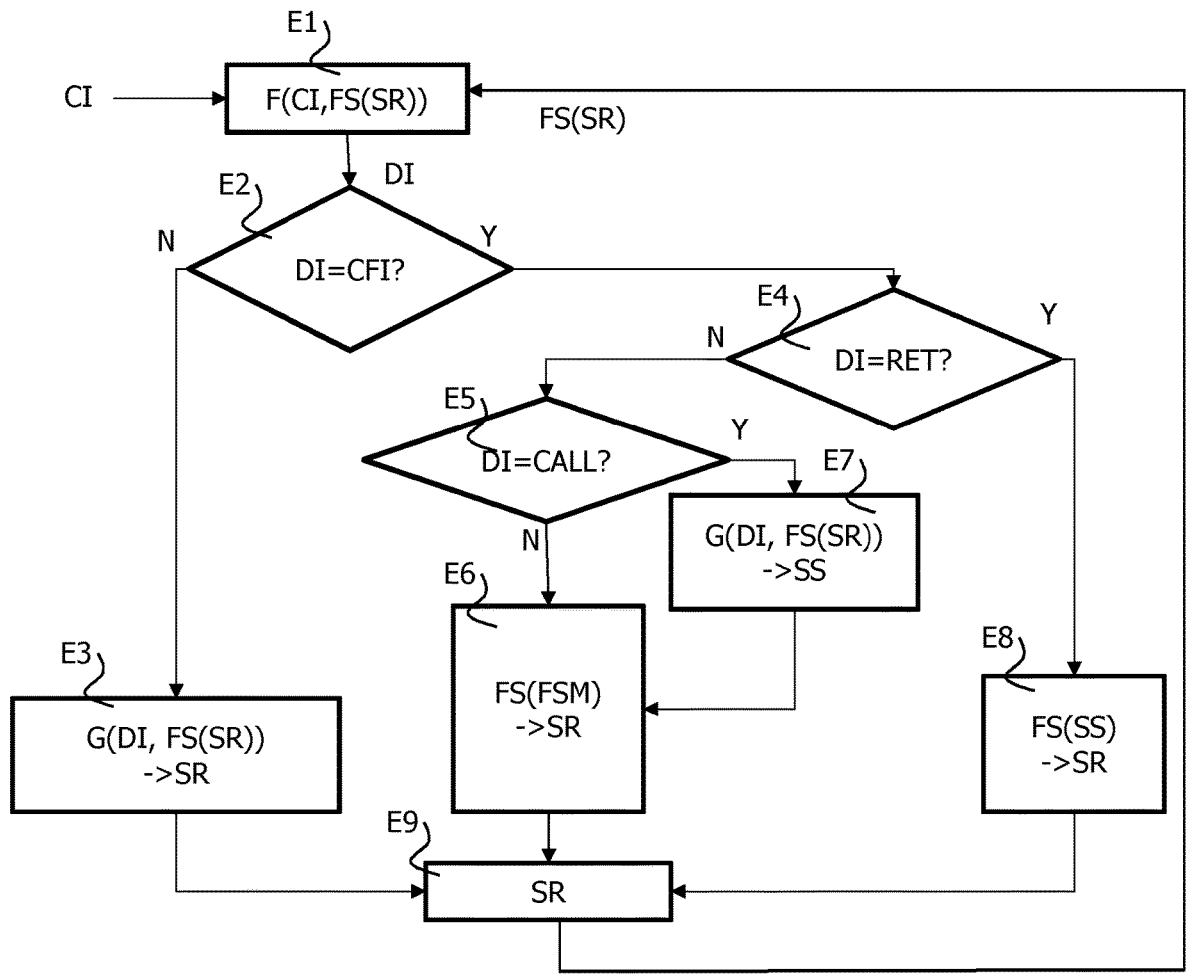
FIG. 3 shows a flowchart of the method of the invention.

FIG. 3 shows a flowchart of the method of the invention.

When a ciphered instruction CI is fetched from system memory SM, the secure agent component SAC de-ciphers the ciphered instruction CI, in first step E1, into a deciphered instruction DI by executing a function F depending on the ciphered instruction CI and on an instruction flow signature FS(SR) corresponding to an initialization value or to the instruction flow signature of the previously deciphered and executed instruction. In the exemplary implementation shown on FIG. 3, the previous instruction flow signature FS to be used to decipher the instruction CI has previously been stored in the signature register SR. The function F uses the instruction flow signature FS(SR) stored in the signature register SR and the ciphered instruction CI.

The deciphered instruction DI is then sent to the CPU for execution.

In parallel, the secure agent component SAC implements the method of the invention to make the next instruction decipherable. For this purpose, the signature register SR is updated in a way depending on the type of the de-ciphered instruction DI: non-control-flow instruction, return instruction, or a control flow instruction other than a return.

In step E2, the secure agent component SAC checks if the deciphered instruction DI as obtained after deciphering using function F is a control flow instruction CFI. Such control flow instructions CFI comprise unconditional branch instructions JMP (jump), conditional branch instructions, call instructions CALL, return instructions RET.

For any instruction DI other than a control flow instruction (case N of step E2), the signature register SR is updated with the result of the execution, in step E3, of a signature function G which depends on the de-ciphered instruction DI and on the previous instruction flow signature FS(SR) as stored in the signature register SR. Thus, after step E3, G(DI,FS(SR)) is stored in the signature register SR in place of the previous value FS(SR).

In the here described exemplary embodiment, the signature function uses the de-ciphered instruction DI. It is however here noted that the signature function could as well be calculated using the ciphered instruction CI. This has no impact on the functioning and the result obtained by the invention.

Figure 4A:
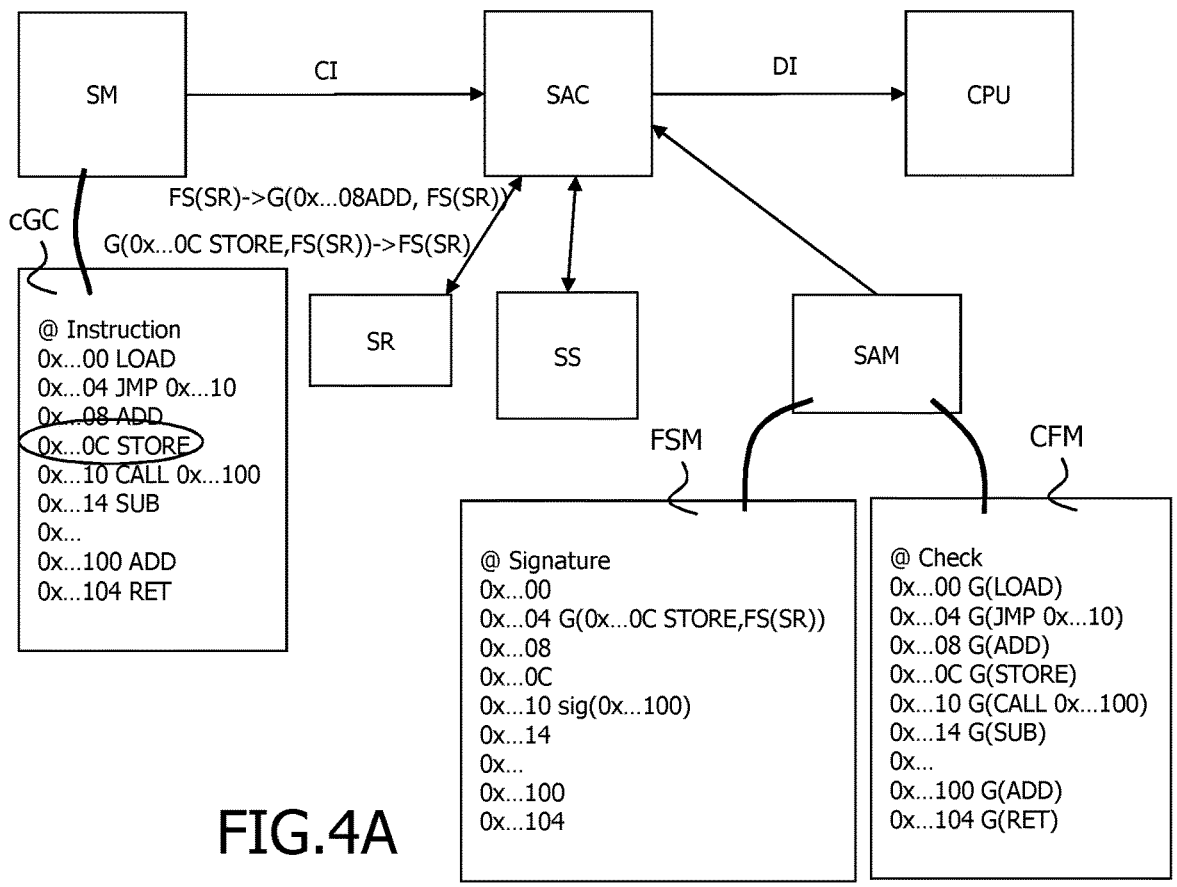
FIGS. 4A, 4B, 4C, 4D illustrate several situations of the functioning of the invention.

This is indeed the case for the store instruction STORE at address 0x . . . 0C in the genuine program cGC as shown on FIG. 4A. For the deciphering of the ciphered store instruction, the instruction flow signature FS(SR) as stored in the signature register SR is sent to a deciphering module in the secure agent component for deciphering of the instruction CI. Once the instruction is deciphered, there is a need for a next instruction flow signature to be stored in the signature register SR. It is thus calculated using the signature function described above as G(0x . . . 00 STORE,FS(SR)) and sent to the signature register SR as the next instruction flow signature FS(SR) to be used.

When the deciphered instruction DI is a control flow instruction (case Y of step E2), the secure agent component SAC checks if this is a return RET instruction in step E4.

In case the deciphered instruction is not a return instruction RET (case N of step E4), it can be a branch instruction, typically a jump instruction JMP, or a call instruction CALL. In such a case, after the deciphering of the instruction as above described using function F, the signature register SR needs to be updated with an instruction flow signature FS(FSM) read from the instruction flow signature memory FSM as illustrated by step E6.

Figure 4B:
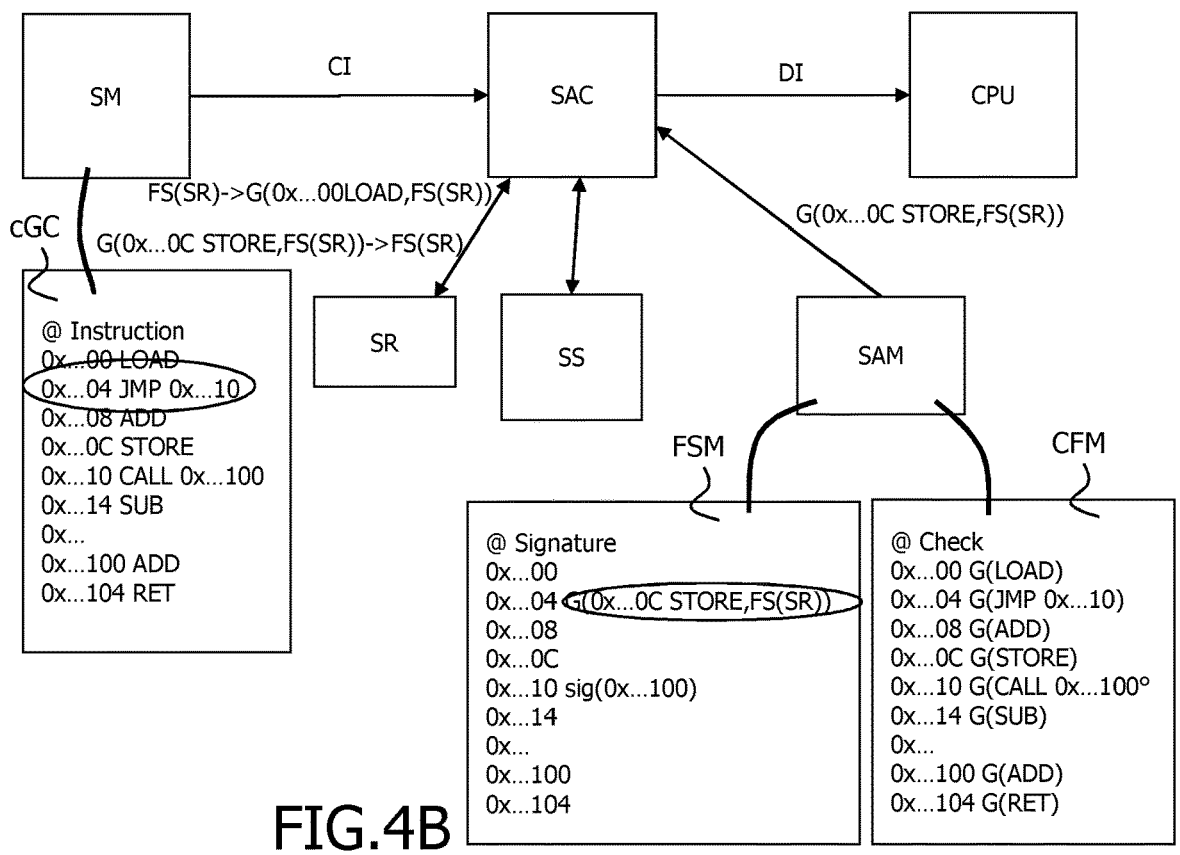

This is illustrated on FIG. 4B where the branch instruction JMP stored at address 0x . . . 04 leads to a jump at address 0x . . . 10 where a call instruction CALL 0x . . . 100 is stored.

For the instruction flow to be correct, the de-ciphering of the call instruction CALL in address 0x . . . 10 cannot use an instruction flow signature calculated from the branch instruction JMP. This is because in the genuine program GC the instruction located before the call instruction at address 0x . . . 10 is not the branch instruction JMP, but indeed a store instruction STORE at address 0x . . . 0C as designated by the oval circle on FIG. 4A. Therefore, the instruction flow signature pre-calculated for de-ciphering the call instruction CALL is based on the store instruction STORE at address 0x . . . C and not the branch instruction JMP from which the control flow reaches the call instruction CALL.

There is thus a need for a previously stored instruction flow signature pre-calculated and stored in the instruction flow signature memory FSM at the time of pre-processing. This is shown at address 0x . . . 04 of the instruction flow signature memory FSM where the G function is applied to the store instruction STORE and the instruction flow signature as stored for the preceding ADD instruction.

Thus the secure agent component SAC has extracted the instruction flow signature (0x . . . 00 LOAD) from the signature register SR to decipher the branch instruction JMP and then retrieves the instruction flow signature G(0x . . . 0C STORE) stored at the address of the branch instruction, 0x . . . 04 here, to place this instruction flow signature in the signature register SR. In such way, the signature register SR stores a correct instruction flow signature FS(FSM)= G(0x . . . 0C STORE) as retrieved and that has to be used for the instruction at the address designated by the branch instruction JMP, i.e. for the call instruction at address 0x . . . 10.

The processing is different in case of a call instruction CALL detected in step E5 performed before step E6. Indeed, in case of a function, before step E6 where the corresponding instruction flow signature FS(FSM) as stored in the instruction flow signature memory FSM is stored in signature register SR, there is a need for the instruction flow signature as calculated using the F function to be kept for further use when the function will end with a return instruction RET. The process is illustrated on FIG. 4C. The instruction flow signature of the previous instruction, i.e. the one G(0x . . . 0C STORE,FS(SR)) of the store instruction, is extracted from the signature SR to be used for deciphering the call instruction.

For a call instruction towards a function that may be used by several call instructions in a same genuine program GC, there is a need for the function to be initiated with an arbitrary value as there is no unique antecedent instruction.

Figure 4C:
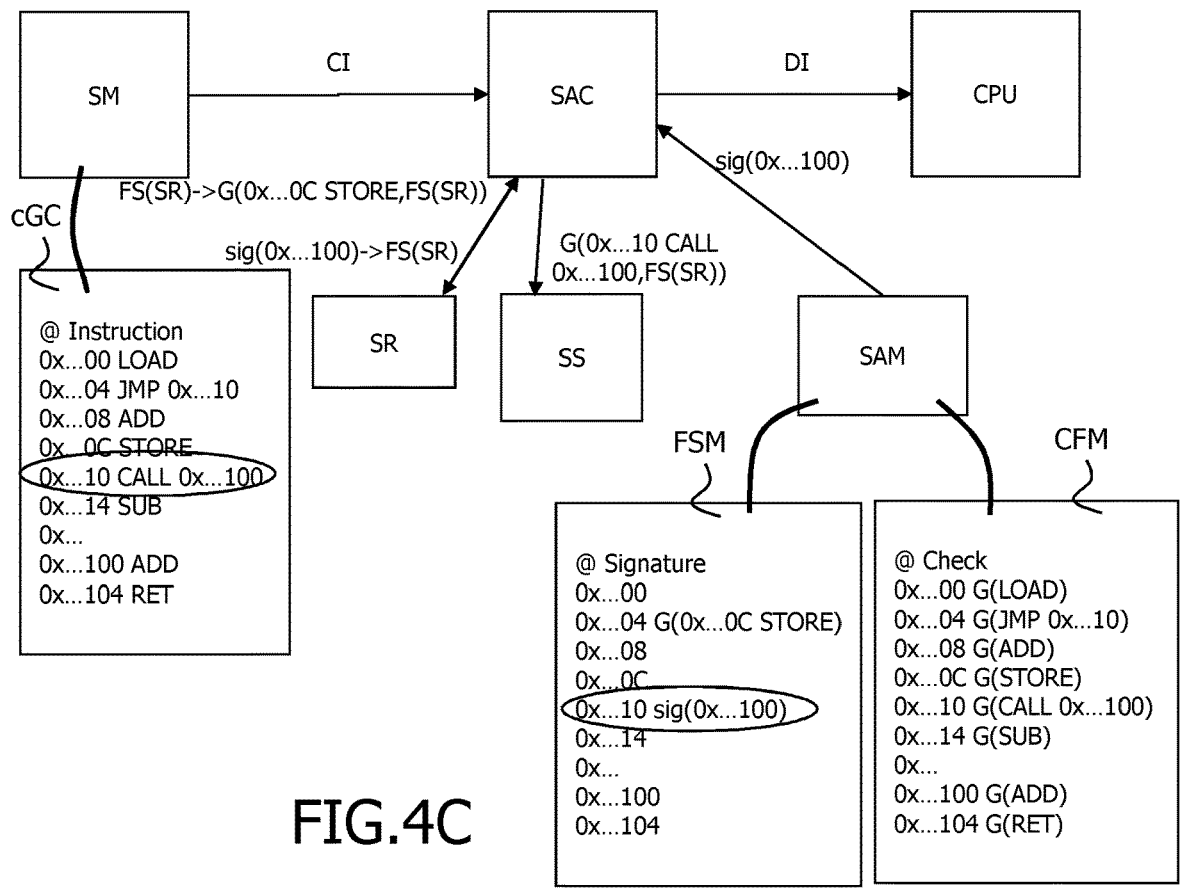

In the example shown on FIG. 4C, the first instruction that will be deciphered in the loop starting at address 0x . . . 100 called by the call instruction at address 0x . . . 10 will use an arbitrary instruction flow signature value, here a signature of the called address sig(0x . . . 100) in the example of FIG. 4C, to enable the deciphering of the ADD instruction at address 0x . . . 100. Of course it is here necessary that the address 0x . . . 100 can only be called by instructions others than the directly previous one which is the case for functions.

As shown on FIG. 4C, this arbitrary instruction flow signature sig(0x . . . 100) will be extracted from the instruction flow signature memory FSM once the call instruction is deciphered. This extracted instruction flow signature sig(0x . . . 100) is then used to determine the instruction flow signature FS(SR) needed to decipher the next instruction, here the ADD instruction as address 0x . . . 100.

Also, to back up the instruction flow signature in the case of call instruction, the secure agent component SAC implements a signature stack SS. The instruction flow signature G(DI,FS(SR)) calculated using the function G, the deciphered call instruction DI and the previously stored instruction flow signature FS(SR), here G(0x10 . . . 10 CALL 0x . . . 100, FS(SR)) as shown on FIG. 4C, is thus pushed on the signature stack SS in step E7.

Figure 4D:
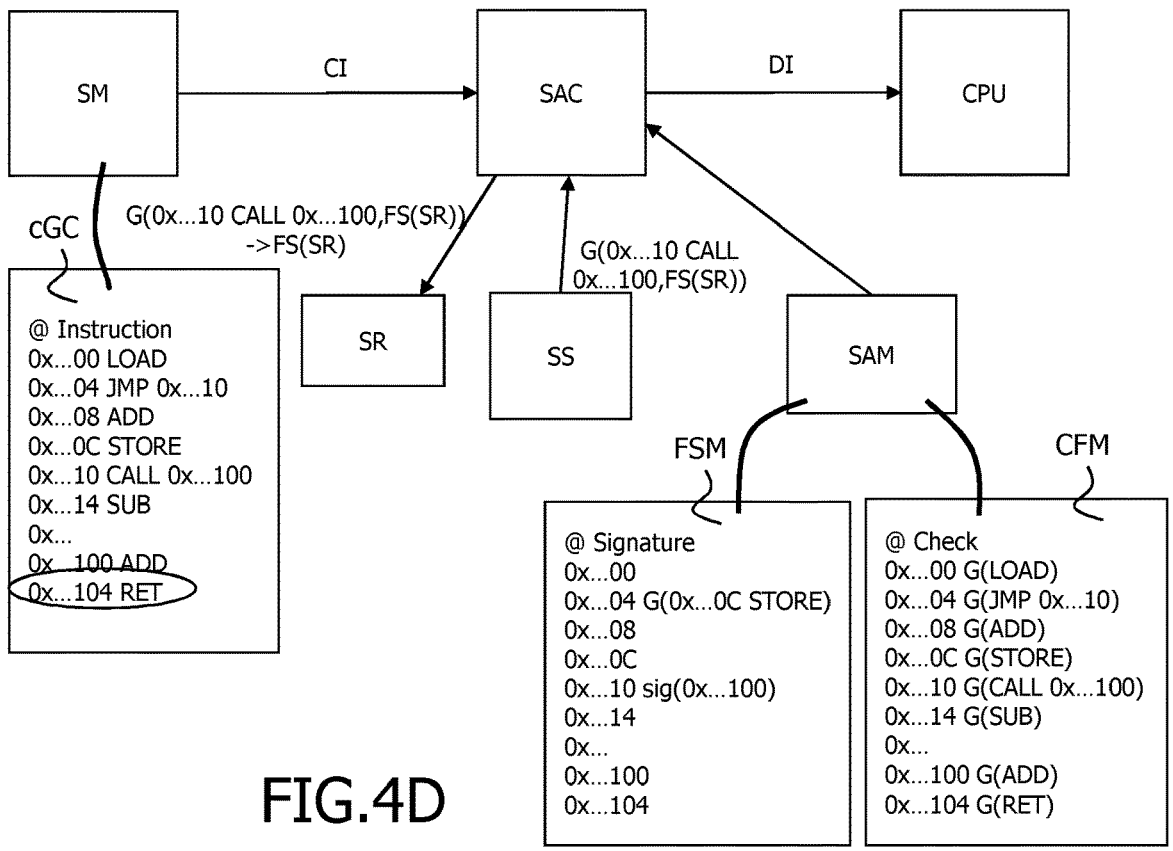

It is then popped from the signature stack SS during the corresponding return instruction RET execution as shown in step E8 in case of positive answer to the test of step E4 (case Y). In step E8 that is performed in case of a return instruction RET is detected, the instruction flow signature FS(SS)=G(0x . . . 10 CALL 0x . . . 100, FS(SR)) as stored in the signature stack SS is used to decipher the instruction following the execution of the return instruction RET, here the instruction 0x . . . 14 SUB. It is thus sent to signature register SR as shown on FIG. 3 and on FIG. 4D.

It is here noted that, due to the fact that execution flow can be suspended by interrupt or exception, the signature stack SS can also be used to push the current signature register SR when entering a software handler and to pop it back when the handler finishes executing.

For the implementation of step E6 and thus to enable the signature register SR updates upon control flow transfers, one instruction flow signature FS(FSM) is stored in the instruction flow signature memory FSM at the corresponding address for each control flow instruction except return instructions where the signature stack SS is used.

The instruction flow signature as thus stored is used to compute the next instruction flow signature. As shown in the diagram of FIG. 3, it is thus stored in the signature register SR for further use for the instruction following the control flow one.

The signature used for a function entry instruction does not depend on the preceding instructions, it can be arbitrary. To introduce diversification, different values can be used for each function.

The instruction flow signature FS(FSM) stored in the signature register SR allows to de-cipher the instruction at the destination of the control flow transfer through the F function. In case of a call instruction, the signature register SR is sent to the signature stack SS before the update is backed up with the instruction flow signature extracted from the instruction flow signature memory FSM for subsequent use with the matching return instruction RET.

For a return instruction RET, the signature register SR is updated with the instruction flow signature FS(SS) backed up in the signature stack SS during the most recently executed call instruction CALL.

The signature register SR thus always contains a signature that depends on the instructions executed previously. This ensures error propagation when an instruction is altered by an attack. All the following instructions will be incorrectly deciphered and even if the faulty instruction is deciphered into a valid one, quickly one of the next instructions will be an unimplemented one.

Thanks to the invention two mechanisms can help in checking the correct execution flow.

First, if, after deciphering, the central processing unit CPU, thanks to an instruction decoder IDC as illustrated on FIG. 2, detects that the deciphered instruction corresponds to an unimplemented instruction, then an illegal opcode alarm AL1 can be raised. During an attack, even a single bit modification in the instruction can have a devastating effect as the faulty instruction may still be a valid one. For instance, instead of using one register, another one will be used. To increase the chance that such case does not occur, the instructions are advantageously ciphered according to the invention with a function having good diffusion properties whereby a single modified bit in the ciphered instruction will generate several modified bits after de-ciphering. Therefore, the chance to obtain an unimplemented instruction is increased.

Second, optionally, a check tag corresponding to any instruction can be read in a dedicated check memory CFM by the secure agent component SAC to be compared to the content of the signature register SR. In case of mismatch, an alarm AL2 can be raised. It is here noted that the signature flow memory FSM and the check memory CFM can be merged. It enables to reduce silicon footprint for the implementation of the invention.

The instruction flow signature length can be fine-tuned in relation to the targeted security level. For instance, 8 bits give the possibility to detect almost 100% of the faults while 1 bit gives 1% detection.

As program needs to be pre-processed and additional information, i.e. the instruction flow signature and, if implemented, the check tags, must be generated prior to the execution of the protected code, product provider must supply the corresponding tools. The protected program requires the presence of the additional instruction flow signature information not belonging to the usual program structure comprising the code and data. The suppression of this information makes the program non-functional on a device that implements the invention.

As conclusion, according to the invention, the instruction flow signatures to be used to prevent anti-re-routing of instructions, are thus calculated linearly, with the calculation being reset at each start of a function. When program execution reaches an instruction other than by linear execution of successive instructions, for example via a branch or a function call/return, the signature register must be realigned to the expected signature at the destination. This means that the instruction flow signatures of the destinations of any transfer of control must be stored in the secure agent memory SAM. It enables to know where any transfer of control "ends up".

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted.

The invention claimed is:

1. An execution system having at least a central processing unit (CPU), a system memory (SM) storing a genuine program (cGC) having ciphered instructions (CI) stored at determined addresses and a secure agent component (SAC) dedicated to the protection of the execution of the genuine program (cGC), said secure agent component (SAC) inserted between the system memory (SM) and the central processing unit (CPU) and fetching the ciphered instructions occurring between system memory (SM) and the central processing unit (CPU), said secure agent component (SAC) comprising at least a signature register (SR) storing an instruction flow signature depending on previously executed instructions and a ciphering/deciphering module, said secure agent component (SAC) being such that, the deciphering module deciphers each fetched ciphered instruction (CI) by executing a function depending on the ciphered instruction (CI) and on the instruction flow signature as stored in the signature register (SR) before sending the de-ciphered instruction (DI) to the central processing unit (CPU), said secure agent component (SAC) then determines a new instruction flow signature depending on the instruction and on the instruction flow signature of the previous instruction in the instruction flow of the genuine program (cGC) before storing this new instruction flow signature in the signature register (SR), said new instruction flow signature used for the deciphering of the next instruction of the genuine program (cGC) to be executed, the genuine program (cGC) comprising branch control flow instructions (JMP), the secure agent component (SAC) further comprises an instruction flow signature memory (FSM) created at the compilation time of the genuine program from a genuine program source, said instruction flow signature memory (FSM) reproducing at least a subset of the determined addresses of the genuine program (cGC) and comprising pre-calculated instruction flow signatures at the corresponding determined addresses of branch control flow instructions (JMP) of the genuine program (cGC), said secure agent component (SAC) being further such that, when a branch control flow instruction is deciphered, the signature register (SR) is overwritten with the instruction flow signature stored in the instruction flow signature memory (FSM) at the corresponding address of the branch control flow instruction (JMP), and the genuine program (cGC) comprising call control flow instructions (CALL), the secure agent component (SAC) further comprises a signature stack (SS), said secure agent component (SAC) being further such that, when a call control flow instruction (CALL) is deciphered, it calculates the new instruction flow signature and pushes it onto the signature stack (SS) before overwriting the signature register (SR) with the instruction flow signature stored in the instruction flow signature memory (FSM) at the corresponding address of the call control flow instruction (CALL).

2. The execution system according to claim 1, said secure agent component (SAC) then determines the new instruction flow signature depending on the ciphered instruction (CI) and on the instruction flow signature of the previous instruction in the instruction flow of the genuine program.

3. The execution system according to claim 2, wherein, the genuine program comprising successive instructions, the secure agent component (SAC) determines the new instruction flow signature by calculation of a signature function depending on the instruction and on the instruction flow signature as used for deciphering and as previously stored in the signature register (SR).

4. The execution system according to claim 3, the signature function is using initial values specific to the execution system.

5. The execution system according to claim 4, wherein the signature function is specific to the execution system.

6. The execution system according to claim 1, wherein, the genuine program (cGC) comprising return control flow instruction (RET), said secure agent component (SAC) being further such that, when a return control flow instruction (RET) is deciphered, it copies the instruction flow signature as stored in the signature stack (SS) in the signature register (SR) as new instruction flow signature to be used for the next instruction.

7. The execution system according to claim 1, wherein secure agent component (SAC) is adapted to access to a check memory (CFM) listing check tags being pre-calculated signature of the instructions stored at the determined addresses of the genuine program (cGC), such signature of the instruction compared to the instruction flow signature for each fetched instruction by the secure agent component (SAC).

8. The execution system according to claim 7, wherein said check memory (CFM) and said instruction flow signature memory (FSM) are merged in a single check and instruction flow signature memory where an instruction flow signature and a check tag are stored at a same address corresponding to the one of the data to be protected in the system memory (SM).

9. A method to protect the execution of a genuine program (cGC) having ciphered instructions (CI) stored in a system memory (SM) at determined addresses, said genuine program (cGC) executed by a central processing unit (CPU) using said system memory (SM), said method implemented by a secure agent component (SAC) dedicated to the protection of the execution of the genuine program (cGC), said secure agent component (SAC) inserted between the system memory (SM) and the central processing unit (CPU) and fetching the ciphered instructions occurring between system memory (SM) and the central processing unit (CPU), said secure agent component (SAC) further comprising at least a signature register (SR) storing an instruction flow signature depending on previously executed instructions and a ciphering/deciphering module, said method comprising the steps of, for the secure agent component (SAC):

deciphering each fetched ciphered instruction (CI) by executing a function depending on the ciphered instruction (CI) and on the instruction flow signature as stored in the signature register (SR), sending the de-ciphered instruction (DI) to the central processing unit (CPU), determining a new instruction flow signature depending on the instruction and on the instruction flow signature of the previous instruction in the instruction flow of the genuine program (cGC), storing the new instruction flow signature in the signature register (SR), using said new instruction flow signature as stored in the signature register (SR) for the deciphering of the next instruction of the genuine program (cGC) to be executed, wherein the genuine program comprising branch control flow instructions (JMP) and the secure agent component (SAC) further comprising an instruction flow signature memory (FSM) created at the compilation time of the genuine program (cGC) from a genuine program source, said instruction flow signature memory (FSM) reproducing the determined addresses of the genuine program (cGC) and comprising pre-calculated instruction flow signatures at the corresponding addresses of control flow instructions of the genuine program (cGC), said method further comprises, when a branch control flow instruction (JMP) is deciphered, the step of overwriting the signature register (SR) with the instruction flow signature stored in the instruction flow signature memory (FSM) at the corresponding address of the branch control flow instruction (JMP), the genuine program (cGC) comprising call control flow instructions (CALL) and the secure agent component (SAC) further comprising a signature stack (SS), the method further comprises the following steps of, when a call control flow instruction (CALL) is deciphered:

calculating of a new instruction flow signature, pushing the new instruction flow signature in the signature stack (SS), overwriting the signature register (SR) with the instruction flow signature stored in the instruction flow signature memory (FSM) at the corresponding address of the call control flow instruction (CALL).

10. The method according to claim 9, wherein, the genuine program (cGC) comprising successive instructions, the new instruction flow signature determination step is performed by calculation of a signature function depending on the instruction and on the instruction flow signature as used for deciphering and as previously stored in the signature register (SR).

11. The method according to claim 9, wherein, the genuine program (cGC) comprising return control flow instruction (RET), said method comprising, when a return control flow instruction (RET) is deciphered, the step of copying the instruction flow signature as stored in the signature stack (SS) in the signature register (SR) as new instruction flow signature to be used for the next instruction.

12. The method according to claim 11, wherein the method comprises the steps of, for the secure agent component (SAC):

accessing to a check memory (CFM) listing check tags pre-calculated signature of the instructions stored at the determined addresses of the genuine program (cGC), comparing such signatures of the instructions to the instruction flow signature for each fetched instruction by the secure agent component (SAC).

* * * * *